(12) United States Patent
Egawa

(10) Patent No.: US 6,392,835 B1
(45) Date of Patent: May 21, 2002

(54) INFORMATION RECORDING MEDIUM LIBRARY APPARATUS IN WHICH THE POSITION OF THE DRIVE IS FIXED IN THE SUB BODY OF THE APPARATUS

(75) Inventor: Kiyoaki Egawa, Yonezawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/525,917

(22) Filed: Mar. 15, 2000

(30) Foreign Application Priority Data

Mar. 18, 1999 (JP) .......................................... 11-074581

(51) Int. Cl.⁷ .......................... G11B 15/68; G11B 17/22
(52) U.S. Cl. ............................. 360/92; 360/30; 360/178
(58) Field of Search ................................ 360/92, 98.04, 360/98.06; 369/30, 178

(56) References Cited

U.S. PATENT DOCUMENTS

| 5,303,214 A | * | 4/1994 | Kulakowski | ............. 360/98.04 |
| 5,646,917 A | * | 7/1997 | Miyoshi | ...................... 369/178 |
| 5,760,995 A | * | 6/1998 | Heller | ........................ 360/98.4 |

FOREIGN PATENT DOCUMENTS

| JP | 5-174475 | 7/1993 |
| JP | 5-189850 | 7/1993 |
| JP | 7-85553 | 3/1995 |
| JP | 2552198 | 8/1996 |
| JP | 9-240810 | 9/1997 |

* cited by examiner

Primary Examiner—A. J. Heinz
(74) Attorney, Agent, or Firm—Foley & Lardner

(57) ABSTRACT

An object of the invention of the present application is to provide an information recording medium library apparatus in which the position of the drive with respect to the main body is fixed precisely, and has a simple structure, and a low cost; in order to achieve the object, the present invention provide an information recording medium library apparatus comprising a main body comprising a storage device for storing a plurality of information recording medium and a transferring device for transferring the information recording medium; and a sub body comprising a drive for reading and information recorded in the information recording medium and writing an information to the information recording medium and a tray for carrying the drive comprising: a sub body fixing device for positioning and fixing the sub body with respect to the main body, a drive positioning equipment for positioning precisely the drive in the tray, a drive fixing equipment for fixing the drive in the tray, abutting portions provided with the tray and the main body for positioning the tray with respect to the main body by abutting the abutting portion provided the tray against the abutting portion provided with the main body, and an elastic member for pushing the tray to the main body side.

8 Claims, 12 Drawing Sheets

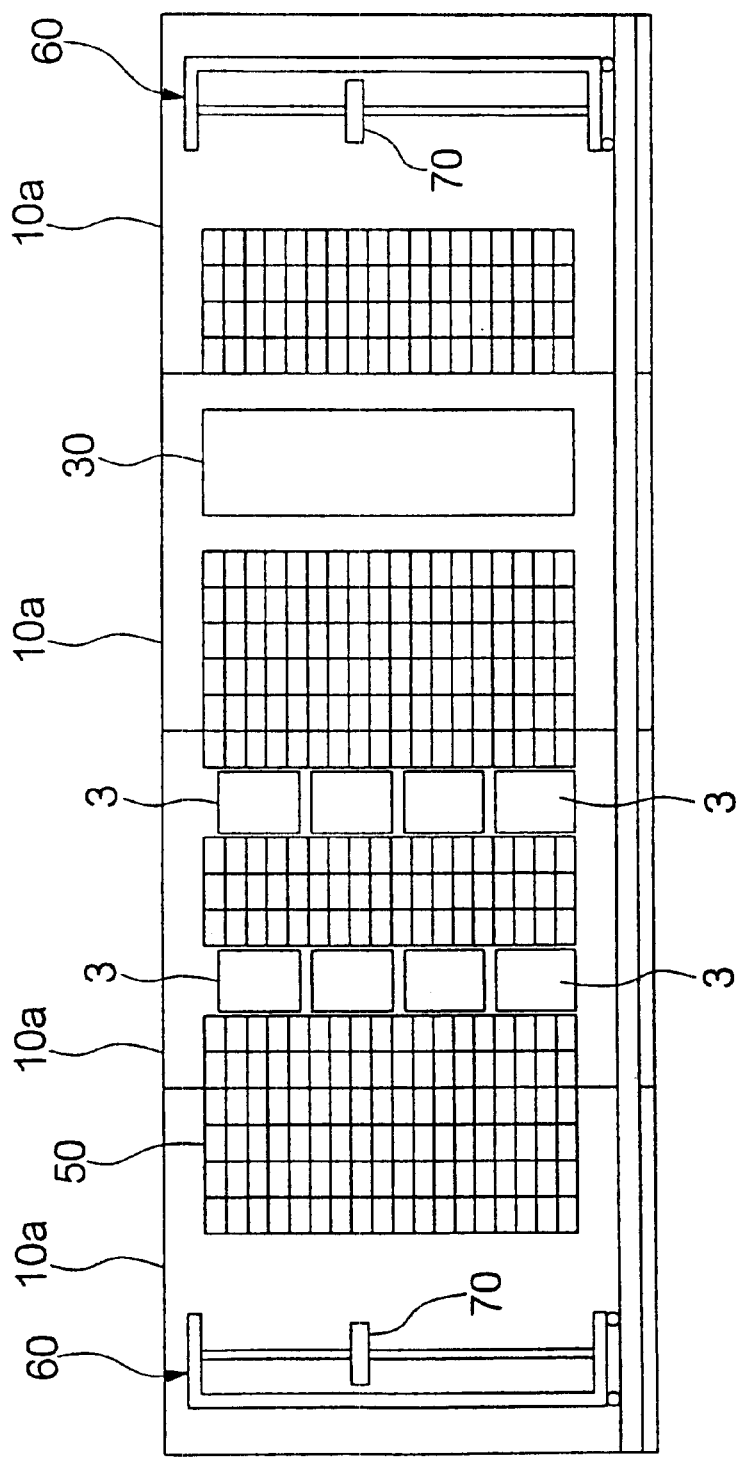

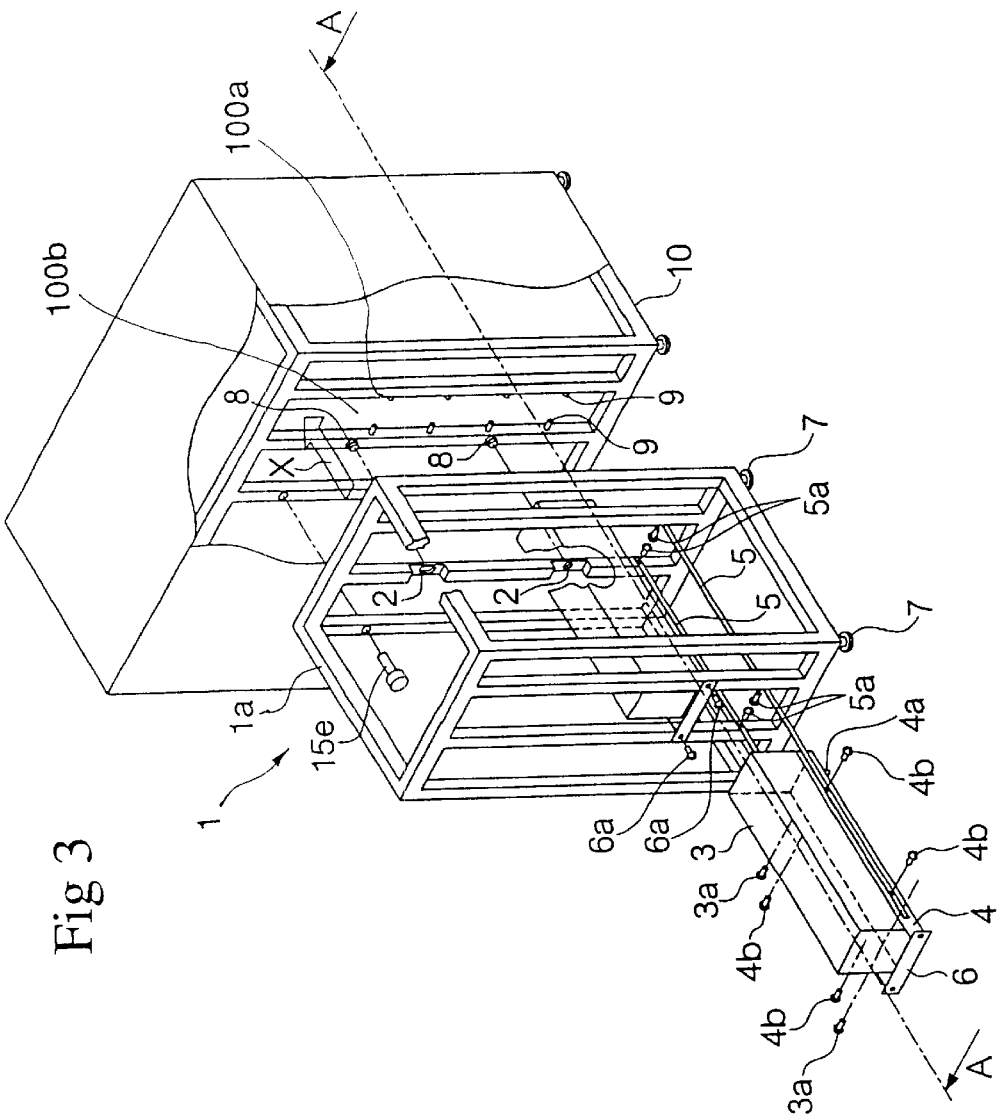

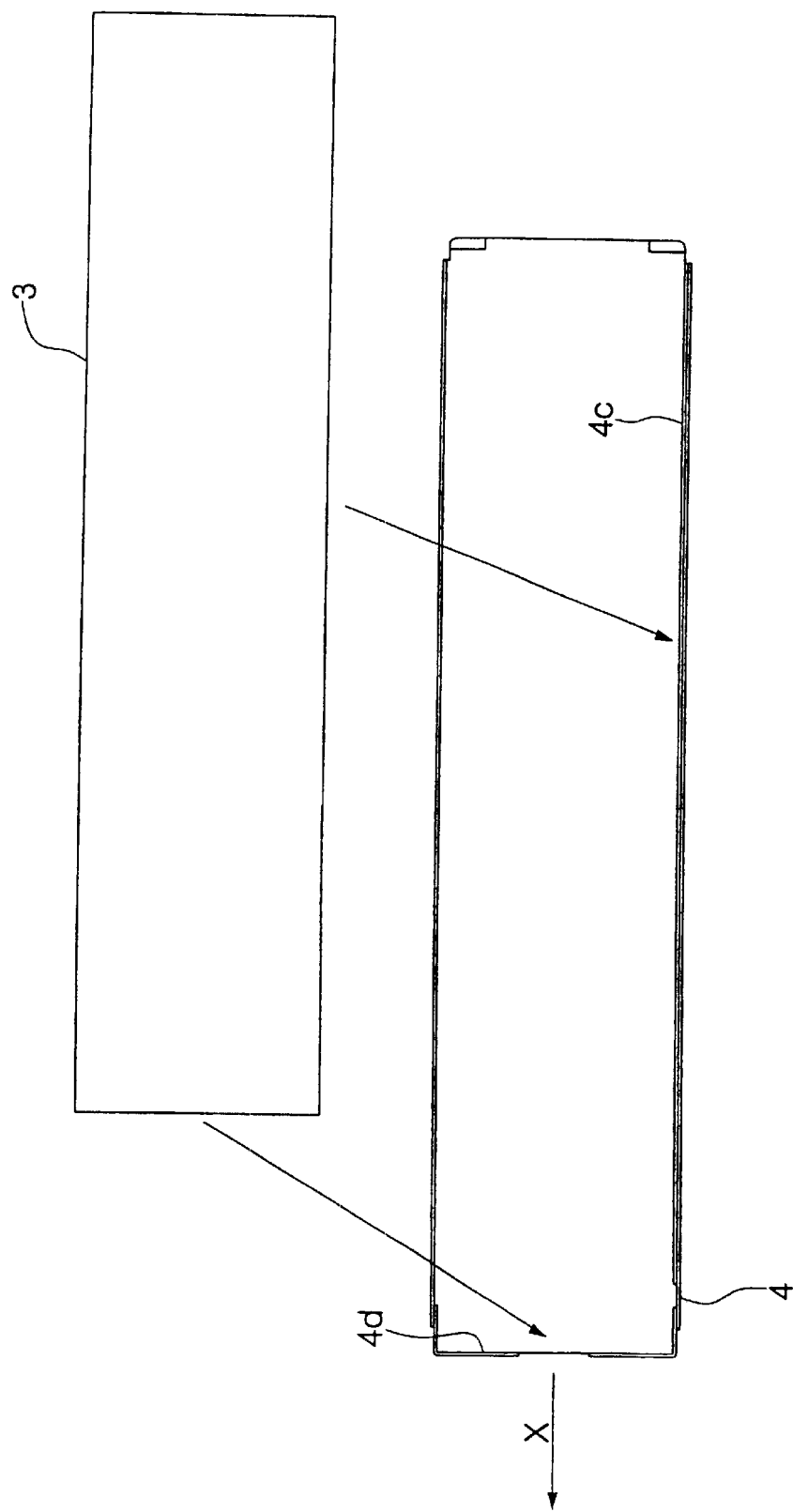

Fig 10A
PRIOR ART
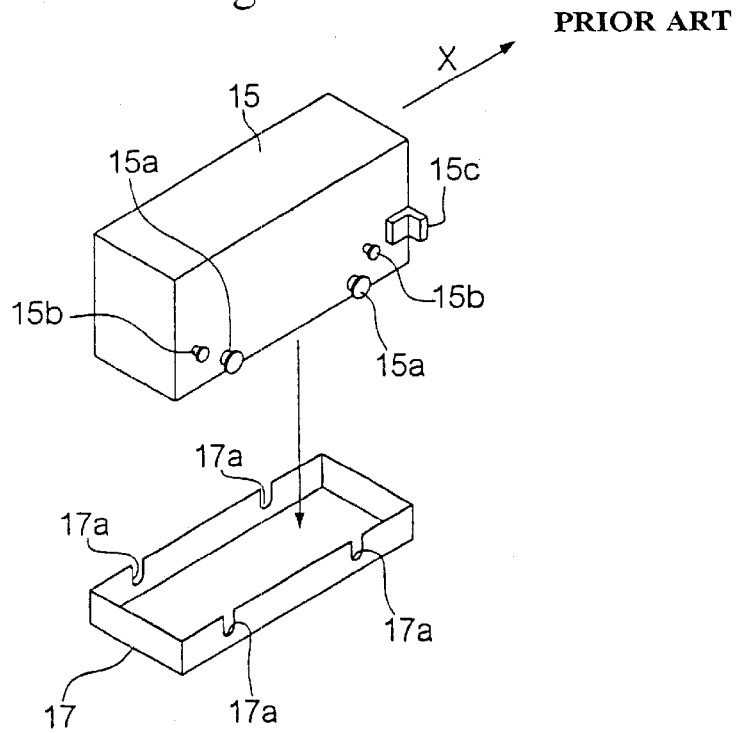
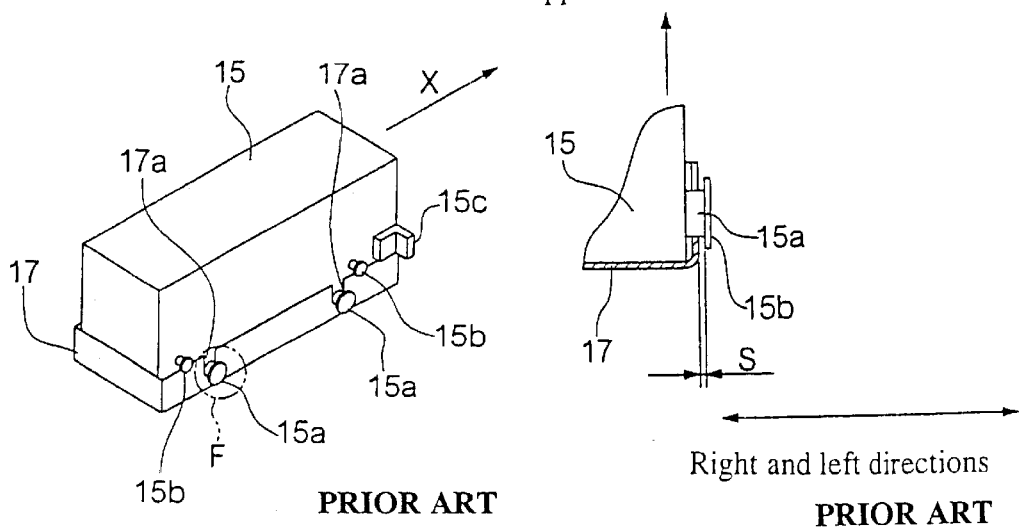
Fig 10B
PRIOR ART
Fig 10C
PRIOR ART

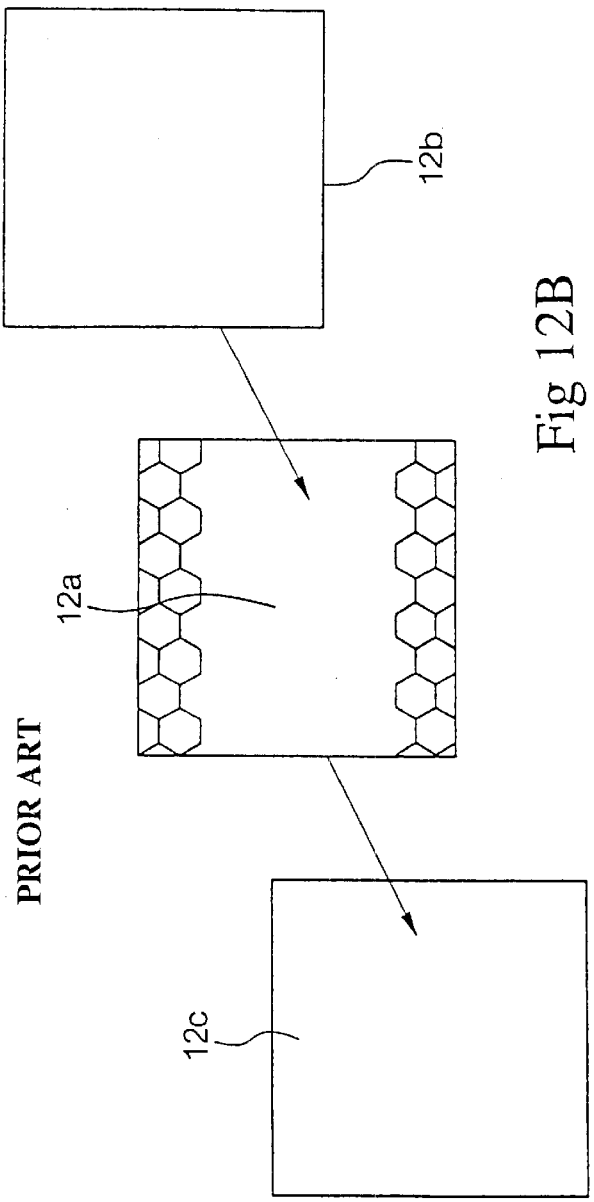
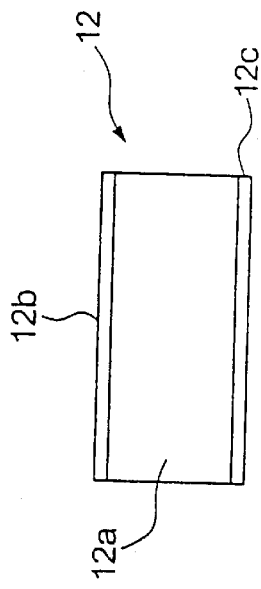
Fig 12A PRIOR ART
Fig 12B PRIOR ART

INFORMATION RECORDING MEDIUM LIBRARY APPARATUS IN WHICH THE POSITION OF THE DRIVE IS FIXED IN THE SUB BODY OF THE APPARATUS

BACK GROUND OF THE INVENTION

1. Field of the Invention

The present invention relates to an information recording medium library apparatus having a structure for positioning a drive. More particularly, the present invention relates to a structure for positioning a drive which reads information recorded in an information recording medium and writes information in an information recording medium with respect to a main body for storing and transferring an information recording medium.

This application is based on Japanese Patent Application No. Hei 11-74581, the contents of which are incorporated herein by reference.

2. Description of the Related Art

A conventional information recording medium library apparatus, for example, a magnetic tape library apparatus, comprises a main body and a sub body. The main body comprises a storage device such as a storage rack for storing a plurality of information recording media such as a magnetic tape, and a transferring device such as an accesser for automatically transferring the magnetic tape. The sub body is provided with a drive for reading and writing the magnetic tape. In this conventional library apparatus, the accesser accesses the required magnetic tape, and removes it from the storage rack. Then the accesser transfers the magnetic tape to the drive. After the recording or playing back the magnetic tape, the accesser returns the magnetic tape in the storage rack. Such a conventional library apparatus is disclosed in the Japanese Patent Publications, First Publication Nos. Hei 05-174475 and Hei 07-85553. In this type of magnetic tape library apparatus, the accesser must precisely transfer the magnetic tape to the required position. Therefore, it is necessary to improve the positioning accuracy of the drive for the storage-rack provided with the main body. Below, the conventional positioning structure for a drive to the storage rack is explained referring to FIGS. 8 to 12.

As shown in FIGS. 8, 9, and 11, the main body 11 comprises a storage rack (storage means) which is an aggregate comprising a plurality of cells 32 for storing magnetic tapes (information recording medium) (not shown in the Figures), a honeycomb 12 for fixing the cells 32 and positioning a drive 15, and a plurality of stays 13 for guiding the drive 15 into the honeycomb 12. The honeycomb 12 is provided with the main body 11 using a plurality of fixtures 33 and 34. A plurality of protrusions 11a for positioning a magnetic tape drive and controller (abbreviated as "MC body" below) are fixed in front of the main body 11. Moreover, the stay 13 is fixed to the honeycomb 12. In order to obtain sufficient strength for supporting the drive 15 and sufficient positioning accuracy for positioning the drive 15, the stay 13 is produced by cutting an aluminum block. In addition, the honeycomb 12 is obtained by sandwiching an aluminum member 12a having a honeycomb structure between aluminum plates 12b and 12c, and adhering, the same to integrate them. The honeycomb 12 has a high resistance to stress applied to the surface, a light-weight.

The MC body 14 is used as a sub body. The MC body 14 comprises rails 16 and trays 17. The rails 16 are partially fixed to the MC body 14, and rails 16 retract in the front (indicated by the X-arrow in Figs) and rear direction. The trays 17 are put onto the rails 16. The drive 5 is mounted on the tray 17. A plurality of positioning holes 14a with which a plurality of protrusions 11a formed on the main body 11 engage are formed in the surface opposite to the main body 11 of the MC body 14. As shown in FIG. 10, the drive 5 is put into the tray 17 so that the drive can move in the upper and lower directions and in the left and right directions. In other words, pins 15a provided with the drive 15 are put into U-shaped grooves 17a of the tray 17, and thereby the drive 15 can move upwardly. Moreover, there is an interval S between a flange portion 15d of the pin 15a and the side wall of the tray 17, as shown in FIG. 10C, and thereby the drive 15 can move in the interval S in the left and right direction. The pins 15a prevent the movement of the drive 15 in the front and rear direction, and control the moving distance of the drive 15 in the left and right direction.

In order to position the drive 15 into the main body 11, the position of the MC body 14 is adjusted so that the protrusions 11a formed on the main body 11 are put into the positioning holes 14a of the MC body 14. The MC body 14 contacts the main body 11 and is fixed to it using a plurality of screws 15e. The drive 15 is pushed ahead, that is, in the direction indicated by the X-arrow. Then, bearings 15b of the drive 15 run on the stays 13 provided with the honeycomb 12, as shown in FIG. 9A, and thereby the position of the drive 15 in the vertical direction is fixed. When the drive 15 is pushed further ahead, a positioning pin 15c formed at a bracket 15g provided with the drive 15 is pushed into a positioning hole 13a formed at the stay 13, as shown in FIG. 9B. Then, the drive 15 is fixed to the stay 13 by screwing a screw 15f into a hole 13b formed at the stay 13 through the bracket 15g. Thereby, the position of the drive 15 with respect to the main body 11 is fixed. In this condition, the drive 15 is partially put into the main body 11 through an opening 35 comprising the honeycomb 12, as shown in FIG. 9A.

As explained above, according to the conventional structure for positioning a drive, the MC body 14 is positioned and fixed to the main body 11, and the drive 15 is positioned and fixed to the honeycomb 12. That is, the conventional structure for positioning a drive adopts a double positioning and fixing processes. Therefore, the structure is complicated, and the cost for the structure increases. Specifically, in order to make the drive 15 precisely enter into the opening 35 formed in the honeycomb 12 which supports a plurality of cells 32, the MC body 14 is positioned and fixed to the main body 11. When the drive 15 is positioned and fixed to the honeycomb 12, the bearing 15b of the drive 15 must run on the stay 13. Therefore, the drive 15 must be able to move upward with respect to the tray 17. In addition, in order to put the pin 15c of the drive 15 into the positioning hole 13a of the stay 13, the drive 15 must be able to move to the left and right with respect to the tray 17. As a result, in order to precisely position the drive 15, an expensive honeycomb 12 and the stay 13 are necessary. In addition, the control equipment for the moving distance of the drive 15 with respect to the tray 17 is complicated. Therefore, the cost for the positioning structure increases.

It is therefore an object of the present invention to provide a structure for positioning a drive, which is provided with a library apparatus for information recording media, which can precisely position the drive with respect to the main body, similarly to the conventional structure, and has a simple structure, and a low cost.

SUMMARY OF THE INVENTION

According to an aspect of the present invention, the present invention provides an information recording medium library apparatus comprising a main body comprising a storage device for storing a plurality of information recording medium and a transferring device for transferring the information recording medium; and a sub body comprising a drive for reading and information recorded in the information recording medium and writing an information to the information recording medium and a tray for carrying the drive comprising:

a sub body fixing device for positioning and fixing the sub body with respect to the main body a drive positioning equipment for positioning precisely the drive in the tray, a drive fixing equipment for fixing the drive in the tray, abutting portions provided with the tray and the main body for positioning the tray with respect to the main body by abutting the abutting portion provided the tray against the abutting portion provided with the main body, and an elastic member for pushing the tray to the main body side.

According to the information recording medium library apparatus, the drive is positioned in the tray by the drive positioning equipment, and is fixed to the tray by the drive fixing equipment. Thereby, the position of the drive is fixed in the sub body. The sub body and the main body are positioned and fixed, similarly to the conventional manner. After that, the position of the drive with respect to the main body is fixed by pushing the drive into the main body before the abutting portion provided with the tray abuts the abutting portion provided with the main body. Furthermore, the position of the drive is fixed with the elastic member. The elastic member pushes the tray to the main body. Thereby, the position of the drive in the main body is fixed.

In other words, the position of the drive is fixed in the sub body in advance. Therefore, the position of the drive in the main body is fixed by only positioning the sub body with respect to the main body. The position of the drive with respect to the main body is easily and simply fixed by the library apparatus of the present invention.

In addition, the tray does not move complicatedly in the library apparatus according to the present invention. Therefore, the library apparatus according to the present invention does not need materials having an excellent strength for positioning the drive, such as a honeycomb and an aluminum material.

BRIEF DESCRIPTION OF THE DRAWINGS

FIG. 2 is a view showing the rear of the information recording medium library apparatus shown in FIG. 1.

FIG. 3 is a perspective view showing an embodiment of the information recording medium library apparatus before assembling.

FIG. 7 is a perspective view for explaining the positioning method of the drive into the tray.

FIG. 10A is a perspective view showing the drive and the tray used for the conventional information recording medium library apparatus.

FIG. 10B is a perspective view showing the drive and the tray after the drive is put into the tray.

FIG. 10C is an enlarged view showing an F part shown in FIG. 10B.

FIG. 12A is a perspective view showing a honeycomb used in the conventional main body before assembling.

FIG. 12B is a cross-sectional view showing a honeycomb shown in FIG. 12A.

DESCRIPTION OF THE PREFERRED EMBODIMENTS

An embodiment of the information recording medium library apparatus according to the present invention will be explained referring to Figures. Moreover, a magnetic tape library apparatus will be explained in the following embodiment as an example of the information recording medium library apparatus of the present invention. However, the present invention is not limited to the magnetic tape library apparatus but certainly includes other information recording medium library apparatuses, such as an optical disk library apparatus.

Figure 1:
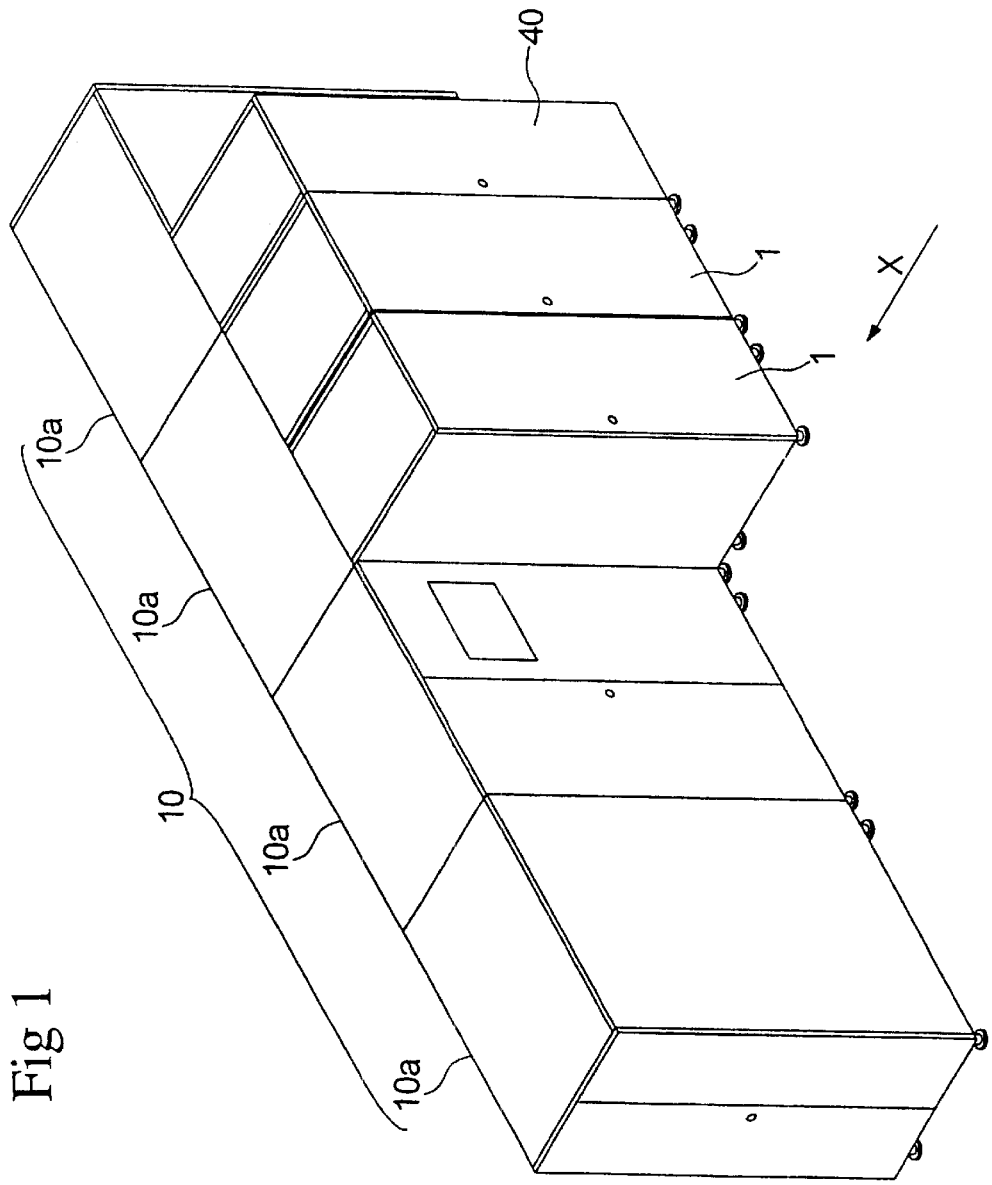
FIG. 1 is a schematic perspective view showing one example of an information recording media library apparatus provided with the structure for positioning a drive of the present invention.

Below, the magnetic tape library apparatus will be explained referring FIGS. 1 and 2. As shown in FIGS. 1 and 2, the magnetic tape library apparatus comprises a main body aggregate 10, two MC bodies 1 and 1, and an accesser controller 40.

The main body aggregate 10 comprises four main bodies 10a. A plurality of cells (storage spaces) 50 are provided within the main body 10a, as shown in FIG. 2. A magnetic tape is stored in the cell 50. The cells 50 are arranged precisely and orderly. In addition, an insertion/ejection portion 30 for the inserting and ejecting of a magnetic tape is provided with the main body 10a. The accesser (transferring device) 60 is provided with the main bodies 10a and 10a arranged at the both ends of the main body aggregate 10, that is, at home positions of the main body aggregate 10. The handle 70 for catching and releasing the magnetic tape is provided with the accesser 60.

The MC body 1 works as a sub body. The MC body is provided with drives 3 (record reproducer).

The accesser controller 40 controls movement of the accesser 60 provided with the main body 10*a*.

When the magnetic tape is inserted by a user from the insertion/ejection portion 30 into the main body 10*a*, the accesser 60 moves and catches the magnetic tape by the handle 70. Then, the accesser 60 transfers the magnetic tape to the drive 3 or the cell 50.

When the magnetic tape is required by a user, the accesser 60 moves to the drive 3 or the cell 50 containing the required magnetic tape. The required magnetic tape is caught by the handle 70, and is removed from the main body 10*a* through the insertion/ejection portion 30.

When recording information on the magnetic tape or reproducing an information recorded on the magnetic tape is required by user, the accesser 60 moves to the cell 50 containing the required magnetic tape, catches the magnetic tape by the handle 70, and removes it from the cell 50. Then, the accesser 60 transfers the magnetic tape to the drive 3. The drive 3 records information on the magnetic tape or reproduces an information recorded in the magnetic tape. After that, the accesser 60 catches the magnetic tape, removes it from the drive 3, and returns it to the cell 50.

Below, components comprising the magnetic tape library apparatus are specifically explained. Moreover, for convenience, the explanation for the accesser controller 40 is omitted.

In addition, the MC body 1 can store therein a plurality of drives 3 so as to form an orderly matrix. The MC body 1 can also position the drives 3 into the main body 10*a* while the positional relationship of the drives 3 is maintained. However, for convenience, the magnetic tape library apparatus provided with one drive 3 will be explained in this embodiment.

As shown in FIG. 3, the main body 10*a* is provided with a frame 100*a* forming an opening 100*b* at the front of the main body 10*a*, which is opposite to the front of the MC body 1. A plurality of protrusions 9 which works as stoppers are provided with the frame 100*a* so that they do not protrude from the front surface of the main body 10*a*, and protrude toward the opening 100*b*. The protrusions 9 form a pair. The pair of the protrusions 9 and 9 is in a line parallel to the width direction of the opening 100*b*. Furthermore, positioning pins 8 for positioning the MC body 1 are provided with the front surface of the main body 10*a*. The positioning pins 8 protrude from the front surface of the main body 10*a*.

As shown in FIG. 3, the MC body 1 comprises a drive 3 for reading or writing the magnetic tape, a frame 1*a*, a tray 4 carrying the drive 3, rails 5 and 5 for guiding the tray 4, and a plate spring 6 for fixing the tray 4 with respect to the main body 10*a*.

The frame 1*a* is provided with positioning holes 2 and level regulators 7. The positioning holes 2 are formed at the front of the frame 1*a*, which is opposite to the front of the main body 10*a*. When the MC body 1 contacts the main body 10*a*, the positioning pins 8 provided with the main body 10*a* are inserted in the positioning holes 2. Thereby, the position of the MC body 1 is fixed with respect to the main body 10*a*. Moreover, when the positioning pins 8 of the main body 10*a* are not inserted in the positioning holes 2, the height of the positioning holes 2 is adjusted by the level regulators 7 which are provided on the bottom of the frame 1*a*. A thread is formed on the surface of the level regulator 7. Therefore, the height of the MC body 1 is adjusted by fastening or loosing the level regulator 7.

The drive 3 is put into the tray 4. The tray 4 is provided with holes for screw 4*b*, protrusions 4*a*, and drive position-ing equipment. The holes for screw 4*b* are provided with the both sides of the tray 4. The tray 4 is fixed to the rails 5 and 5 by inserting screws 4*b* in the holes. Two protrusions 4*a* are formed integrally with the front portion of the bottom of the tray 4. The protrusions 4*a* are arranged in a line parallel to the width direction of the tray 4. The protrusions 4*a* abut the protrusions 9 provided with the front of the main body 10*a*; therefore, they work as stoppers. The drive positioning equipment comprises two perpendicular side surfaces 4*c* and 4*d*, as shown in FIG. 7. When the drive 3 is put into the tray 4 so that the two perpendicular side surfaces of the drive 3 contact the drive positioning equipment comprising the two perpendicular side surfaces 4*c* and 4*d* of the tray 4, the drive 3 is positioned precisely with respect to the The rails 5 and 5 are partially fixed to the frame 1 a using screws 5*a*. The rails 5 and 5 are retractable in the front (indicated by the X-arrow in FIG. 3) and rear directions. Therefore, the drive 3 put into the tray 4 moves in the forward and rearward directions due to the retractibility of the rails 5 and 5.

Figure 4A:
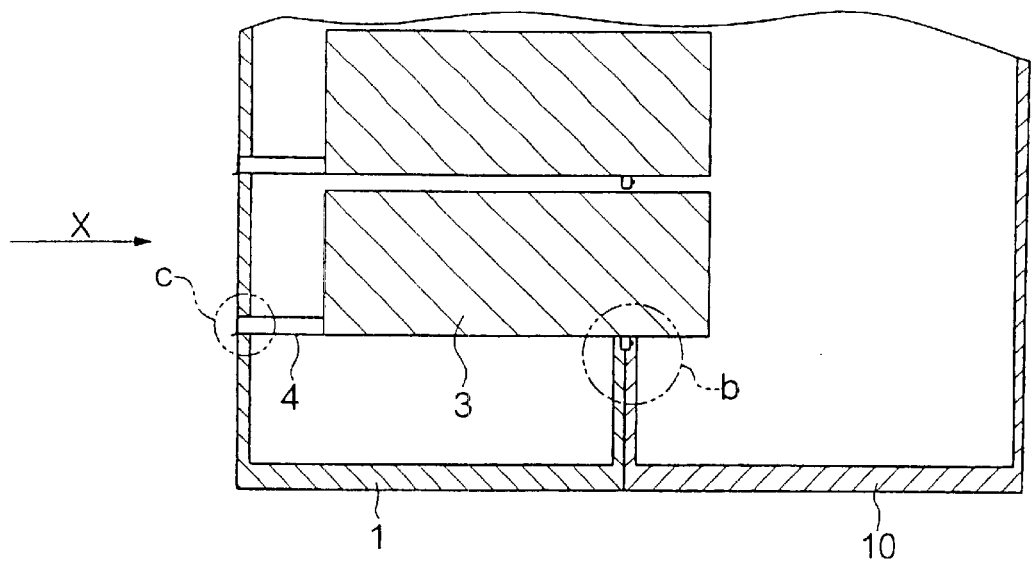
FIG. 4A is a partial enlarged view showing the information recording medium library apparatus after assembling.
Figure 4B:
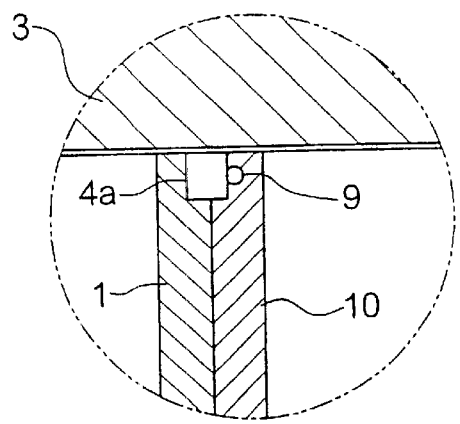
FIG. 4B is an enlarged view showing a b part shown in FIG. 4A.
Figure 4C:
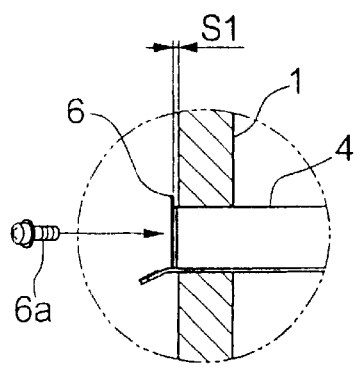
FIG. 4C is an enlarged view showing a c part shown in FIG. 4A.

The plate spring 6 has elasticity, and is used for fixing the tray 4 with respect to the main body 10*a*. The plate spring 6 is provided at the rear side of the frame 1*a* using screws 6*a* and 6*a*, as shown in FIGS. 3 and 4C. The plate spring 6 contacts the rear ends of the side walls of the tray 4, and provides a potential energy for moving ahead to the tray 4. That is, the plate spring 6 pushes the tray 4 to the main body 10*a*.

Figure 5B:
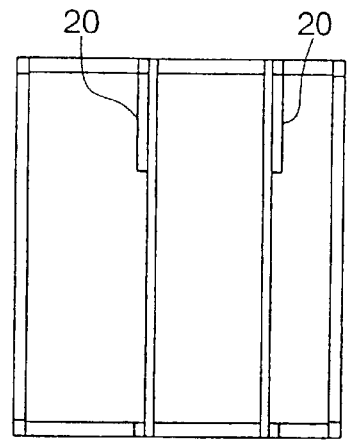
FIG. 5B is a cross-sectional view along line D—D of FIG. 5A.
Figure 5C:
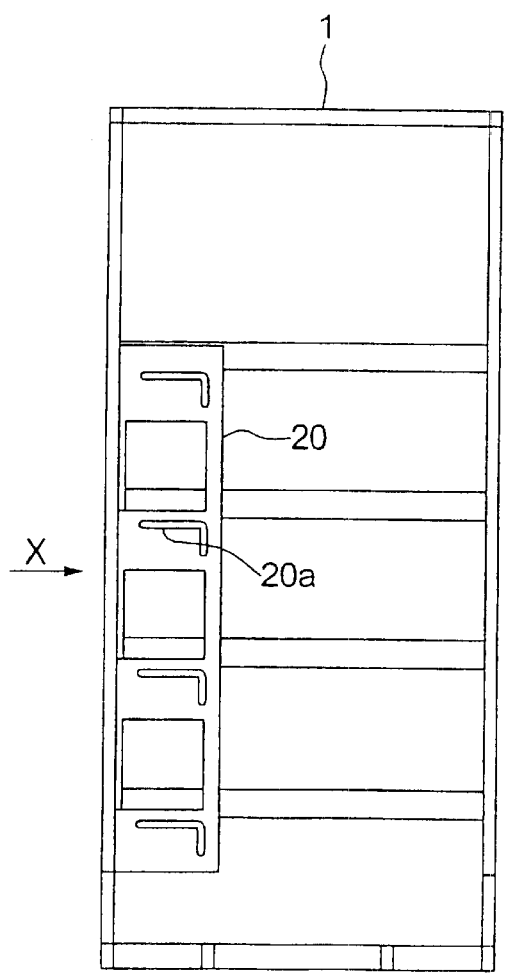
FIG. 5C is a plane view of the sub body shown in FIG. 5A.
Figure 5A:
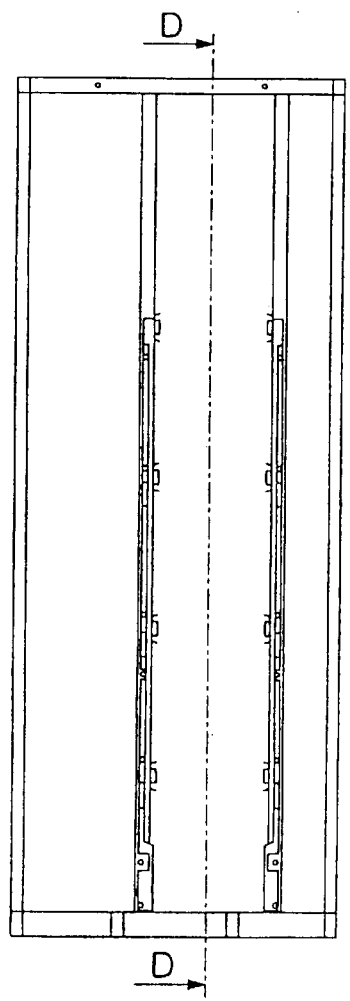
FIG. 5A is a schematic view showing the front of the sub body.
Figure 6A:
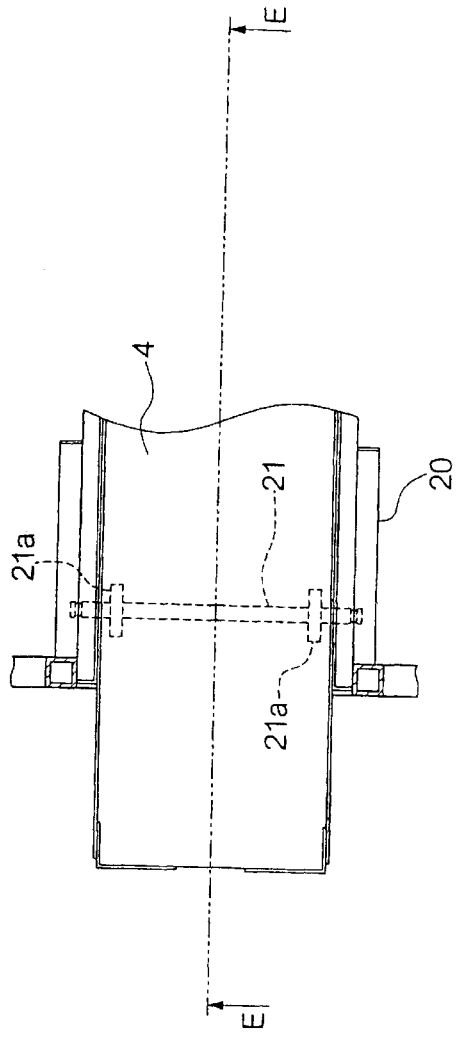
FIG. 6A is a plane view showing a tray positioning device provided with the sub body.
Figure 6B:
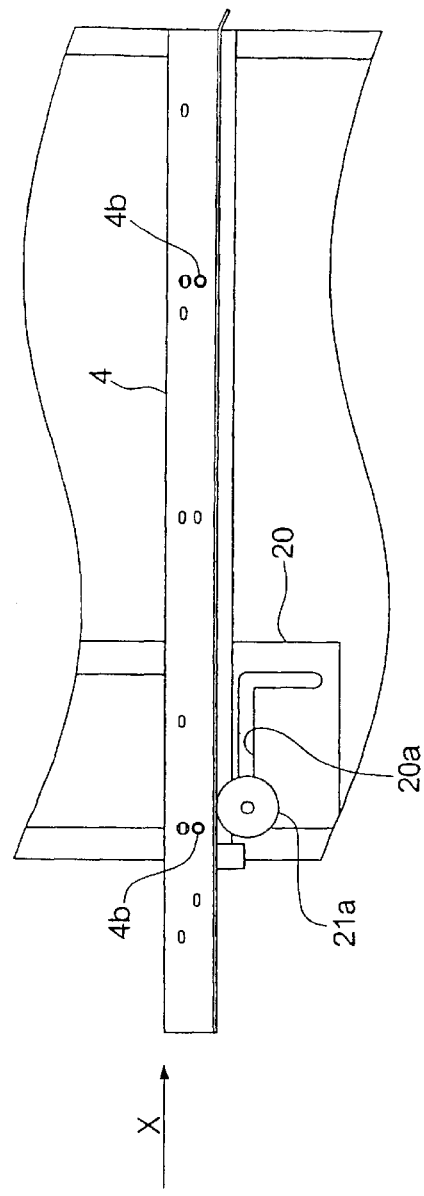
FIG. 6B is a cross-sectional view along line E—E of FIG. 6A.
Figure 8:
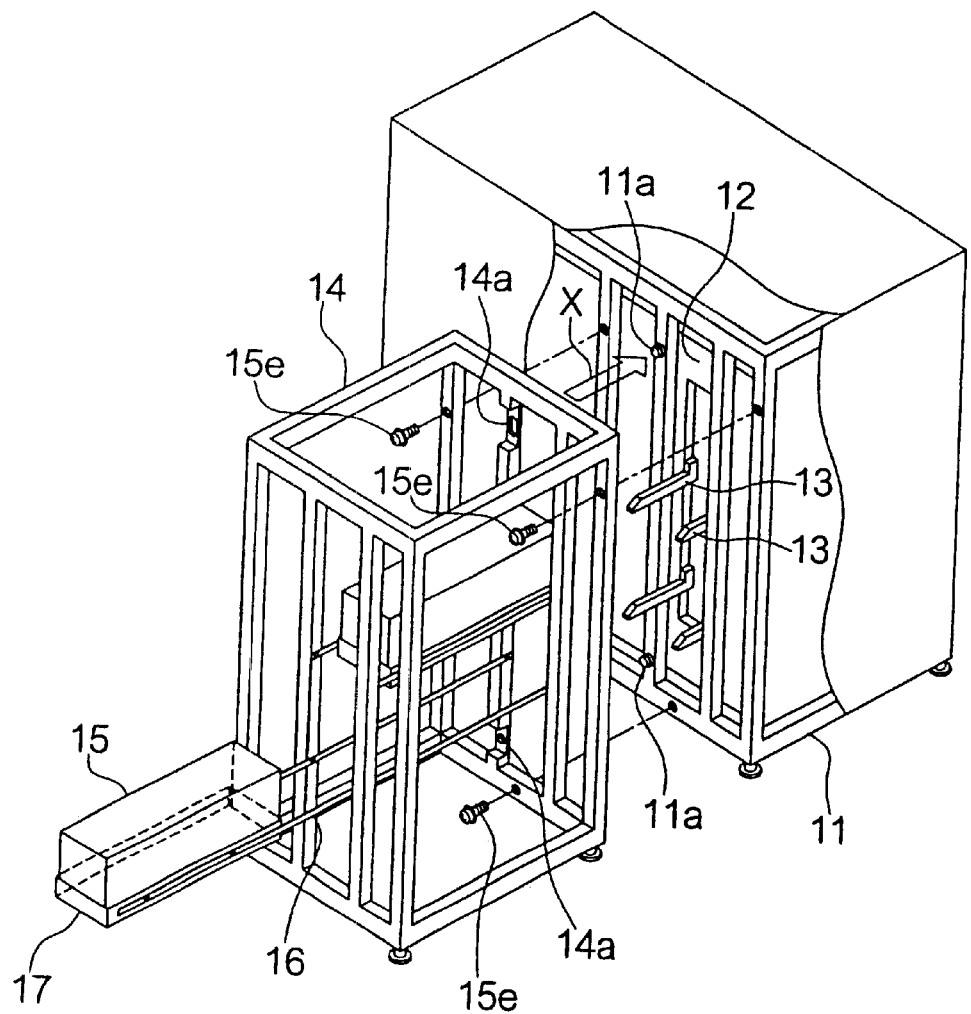
FIG. 8 is a perspective view showing the conventional information recording medium library apparatus before assembling.
Figure 9A:
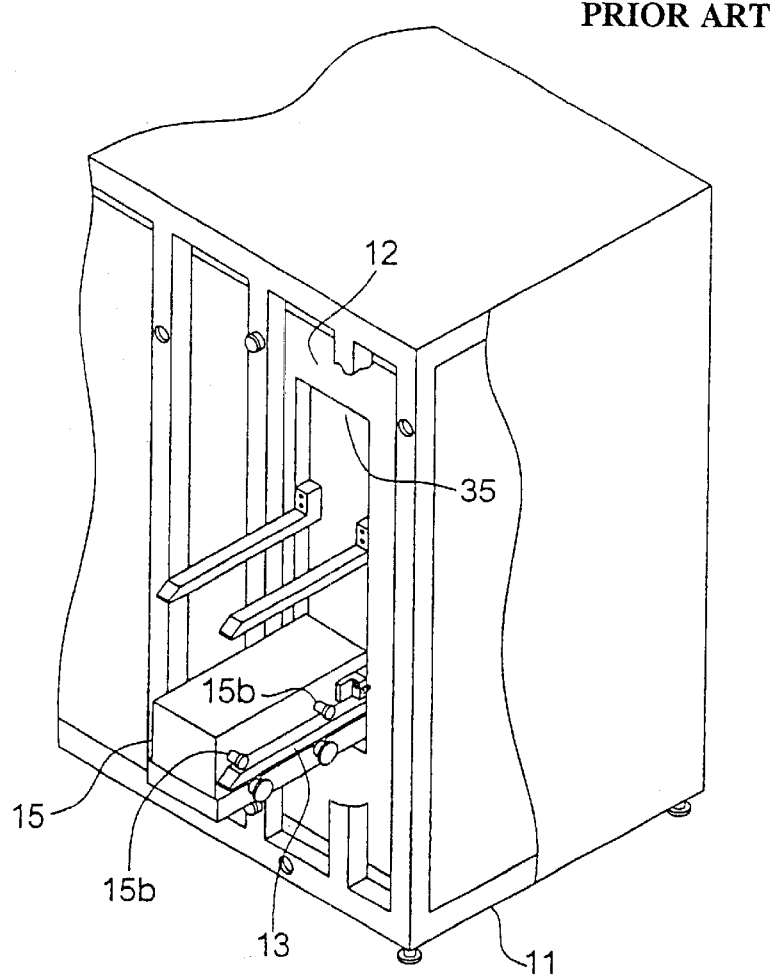
FIG. 9A is a perspective view showing the conventional information recording medium library apparatus after assembling.
Figure 9B:
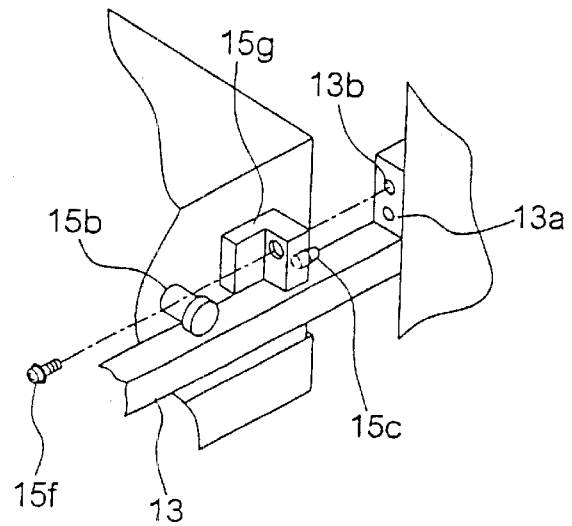
FIG. 9B is an enlarged view showing the positioning portion provided with the drive with respect to the main body, which is shown in FIG. 9A.
Figure 11A:
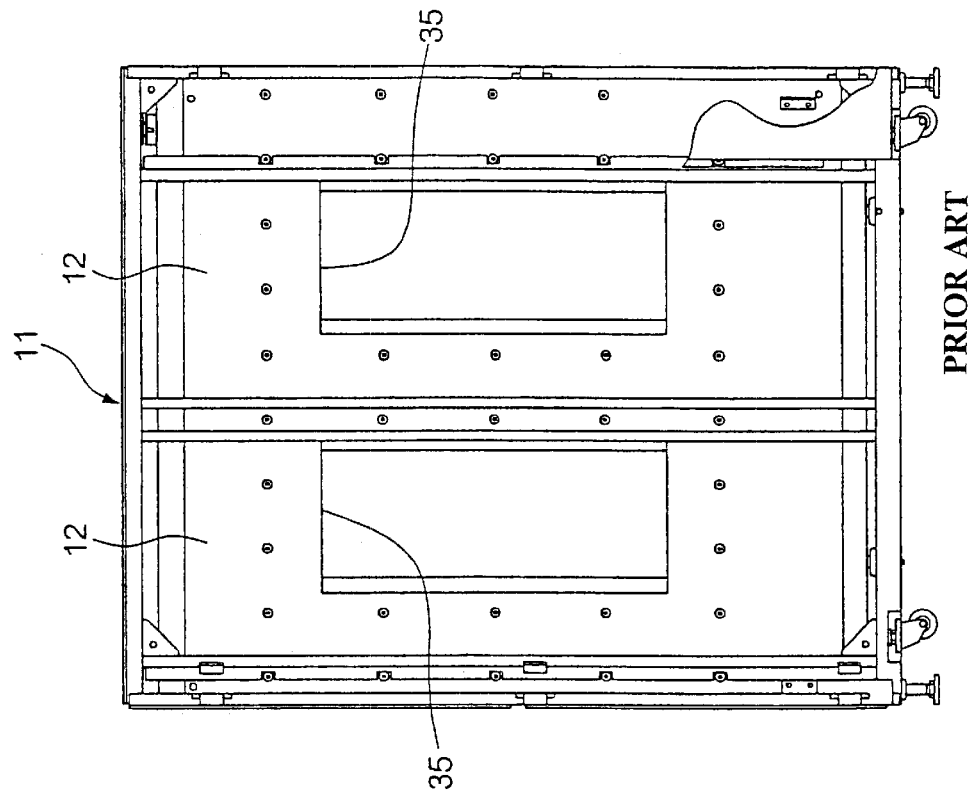
FIG. 11A is a schematic view showing the front of the conventional main body.
Figure 11B:
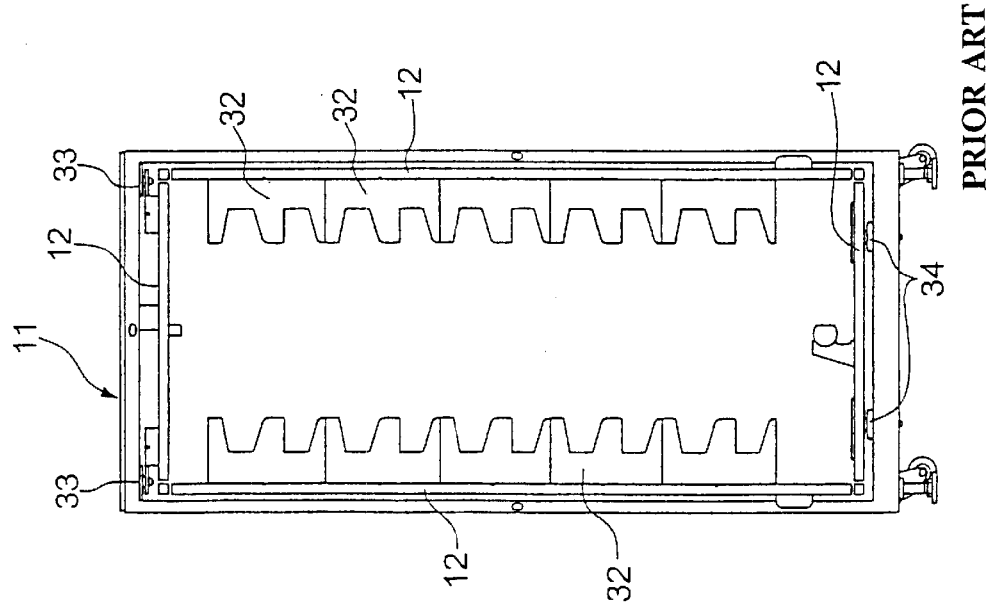
FIG. 11B shows the left side of the conventional main body shown in FIG. 11A.

Moreover, a tray supporter is preferably provided with the MC body 1. The tray supporter comprises a guide 20 and a roller member 21. The guide 20 comprises a plurality of grooves 20*a* in an L-shape, as shown in FIG. 5B. The grooves 20*a* are in an L-shape in this embodiment, but the shape of the grooves 20*a* is not limited to the L-shape, and includes other shapes, such as a linear shape. A pair of the guides 20 is provided to the frame 1*a* so as to face each other, as shown in FIGS. 5A to 5C. Moreover, a part of the groove 20*a* which is parallel to the tray 4 is positioned near and under the bottom of the tray 4, as shown in FIG. 5B. The roller member 21 comprises a shaft and rollers 21*a* provided with both sides of the shaft, as shown in FIGS. 6A and 6B. The shaft is supported by the grooves 20*a* of the guide 20. The tray 4 is put onto the roller member 21. The bottom of the tray 4 contacts rollers 21*a*. When the tray supporter is used, the position of the tray 4 onto the retractable rails 5 and 5 is fixed precisely. In other words, the bottom of the tray 4 is supported by the tray supporter; therefore, the position of the tray 4 is fixed in the upper and lower directions. That is, the position of the tray 4 is fixed in the MC body 1.

Below, the assembly method of the magnetic tape library apparatus will be explained.

The retractable rails 5 and 5 are fixed partially to the frame 1*a* of the MC body 1 using screws 5*a*. The tray 4 is put on and fixed at the rear portion of the rails 5 and 5 using screws 4*b*. Then the drive 3 is put into the tray 4. At this time, the two perpendicular side surfaces of the drive 3 contact the drive positioning equipment comprising the two perpendicular side surfaces 4*c* and 4*d* of the tray 4, and thereby the drive 3 is positioned precisely in the tray 4. After that, the drive 3 is fixed into the tray 4 using drive fixing equipment such as a screw 3*a*. Then, the MC body 1 is pushed ahead and contacts the main body 10*a*. Thereby, the positioning pins 8 provided with the main body 10*a* are inserted in the positioning holes 2 formed at the MC body 1. When the positioning pins 8 are not inserted in the positioning holes 2, the height of the positioning holes 2 is adjusted using the level regulators 7. The MC body 1 is fixed to the main body 10a using a screw 15e, similar to the conventional apparatus. Moreover, for convenience, only one screw 15e is shown in FIG. 3. Then, the tray 4 carrying the drive 3 is pushed ahead, that is, so as to partially enter into the main body 10a through the opening 100b, as shown in FIG. 4A. After that, as shown in FIG. 4C, the plate spring 6 is fixed to the MC body 1 using screw 6a. The plate spring 6 contacts the rear ends of the side walls of the tray 4, and provides a potential energy for moving ahead to the tray 4. That is, the plate spring 6 pushes the tray 4 ahead, namely, to the main body 10a. Then, the protrusions 4a formed on the bottom of the tray 4 abut the protrusions 9 formed on the front of the main body 10a, as shown in FIGS. 4A and 4C. Thereby, the position of the drive 3 is fixed with respect to the main body 10a in the forward and rearward directions. Specifically, the plate spring 6 has elasticity so that when the protrusions 4a of the tray 4 abut the protrusions 9 of the main body 10a, a space S1 is opened between the plate spring 6 and MC body 1, as shown in FIG. 4C. While maintaining the space S1, the plate spring 6 is fixed to the MC body 1 using the screw 6a. Then, the position of the tray 4 in the front and rear direction is fixed precisely by always being pressed ahead.

Moreover, when the tray supporter is used, a pair of the guides 20 is provided to the frame 1a so as to face each other, as shown in FIGS. 5A to 5C, and a part of the groove 20a which is parallel to the tray 4 is positioned near and under the bottom of the tray 4, as shown in FIG. 5B. The shaft comprising roller member 21 is inserted into the grooves 20a so that the both ends of the shaft are supported by the grooves 20a and 20a. Then, the tray 4 is put onto the roller member 21. After that, the tray 4 is fixed to the rails 5 and 5 by inserting screws 4b in the holes, as shown in FIG. 3.

As explained above, the position of the drive 3 in the MC body 1 in the upper and lower directions is fixed by the tray 4 carrying the drive 3 is fixed to the rails 5 and 5. Moreover, when the tray supporter is used, the position of the drive 3 is also fixed precisely in the upper and lower directions. The MC body 1 carrying the drive 3 is fixed to the main body 10a using the positioning pins 8 and the positioning holes 2. Thereby, the position of the drive 3 in the upper and lower directions is also fixed precisely with respect to the main body 10a. The position of the drive 3 in the main body 10a in the forward and rearward directions is fixed precisely by abutting the protrusions 4a formed at the bottom of the tray 4 carrying the drive 3 to the protrusions 9 provided with the main body 10a. The position of the drive 3 with respect to the main body 10a is fixed precisely by these processes.

In the conventional library apparatus, when the drive must move on the slide 13 in the right and left directions and upper and lower directions, and an undesirable pressure is applied to the slides 13. Therefore, it is necessary to use a honeycomb or aluminum material having an excellent strength for the slides 13 and the member supporting the slides 13. In contrast, as explained above, when the drive 3 is positioned in the main body 10a, undesirable pressure is not applied to the main body 10a in this embodiment. Therefore, the expensive honeycomb and aluminum material are not necessary, and an inexpensive plate member can be used in this embodiment instead of the expensive member. In addition, the magnetic tape library apparatus has simple structure, a high positioning accuracy, and a low cost.

Moreover, after the MC body 1 is positioned with respect to the main body 10 and is fixed to it, the tray 4 carrying the drive 3 is pushed ahead in this embodiment. However, it is possible to push the tray 4 carrying the drive 3 ahead and to fix the MC body 1 with respect to the main body 10a.

In addition, the position of the MC body is fixed with respect to the main body 10a by inserting the positioning pins 8 into the positioning holes 2 in this embodiment. However, it is also possible to use the MC body 1 having a standard surface and the main body 10a having a standard surface, abut these standard surfaces, and thereby fix the position of the MC body 1 with respect to the main body 10a.

Furthermore, the position of the tray 4 is fixed with respect to the main body 10a using the protrusions 4a and the protrusions 9 in this embodiment. However, it is also possible to use the tray 4 having a standard surface and the main body 10a having a standard surface, abut these standard surfaces, and thereby fix the position of the tray 4 with respect to the main body 10a.

What is claimed is:

1. An information recording medium library apparatus comprising a main body comprising a storage device for storing a plurality of information recording medium and a transferring device for transferring the information recording medium; and a sub body comprising a drive for reading and information recorded in the information recording medium and writing an information to the information recording medium and a tray for carrying the drive comprising:

a sub body fixing device for positioning and fixing the sub body with respect to the main body a drive positioning equipment for positioning precisely the drive in the tray, a drive fixing equipment for fixing the drive in the tray, abutting portions provided with the tray and the main body for positioning the tray with respect to the main body by abutting the abutting portion provided the tray against the abutting portion provided with the main body, and an elastic member for pushing the tray to the main body side.

2. An information recording medium library apparatus according to claim 1, wherein said drive positioning equipment is a reference surface provided with the tray.

3. An information recording medium library apparatus according to claim 1, wherein said abutting portions are protrusions.

4. An information recording medium library apparatus according to claim 1, wherein said elastic member is a plate spring.

5. An information recording medium library apparatus according to claim 1, wherein said sub body fixing device comprises a positioning pin provided with the front of the main body and a positioning hole formed at the front of the sub body, said drive positioning equipment comprises two perpendicular side surfaces of the tray, said drive fixing equipment is a screw, one of said abutting portions is provided with the bottom of the tray, and the other is provided with the front of the main body so that it does not protrude from the front surface of the main body.

6. An information recording medium library apparatus according to claim 5, wherein a tray supporter for fixing the position of the tray in the upper and lower directions is provided within the sub body.

7. An information recording medium library apparatus according to claim 6, wherein said tray supporter comprises a guide provided with at least one groove and a roller member comprising a shaft and rollers provided with both sides of the shaft.

8. An information recording medium library apparatus according to claim 7, wherein the guide is provided with a flame of the sub body so that the groove is positioned near and under the bottom of the tray, and the roller member is positioned so that the shaft is supported by the grooves and the roller supports the bottom of the tray.

* * * * *